April 14, 1970 W. A. HUNTER 3,506,058
METHOD OF MATCHPLATE MOULDING
Original Filed Nov. 16, 1964 10 Sheets-Sheet 1

INVENTOR
WILLIAM ALLAN HUNTER

BY
Richard L. Lindberg
ATTORNEY

April 14, 1970 W. A. HUNTER 3,506,058
METHOD OF MATCHPLATE MOULDING
Original Filed Nov. 16, 1964 10 Sheets-Sheet 3

INVENTOR
WILLIAM ALLAN HUNTER

BY
*Ces T. Lindberg*
ATTORNEY

April 14, 1970  W. A. HUNTER  3,506,058
METHOD OF MATCHPLATE MOULDING
Original Filed Nov. 16, 1964  10 Sheets-Sheet 4

INVENTOR
WILLIAM ALLAN HUNTER
BY
*Lindberg*
ATTORNEY

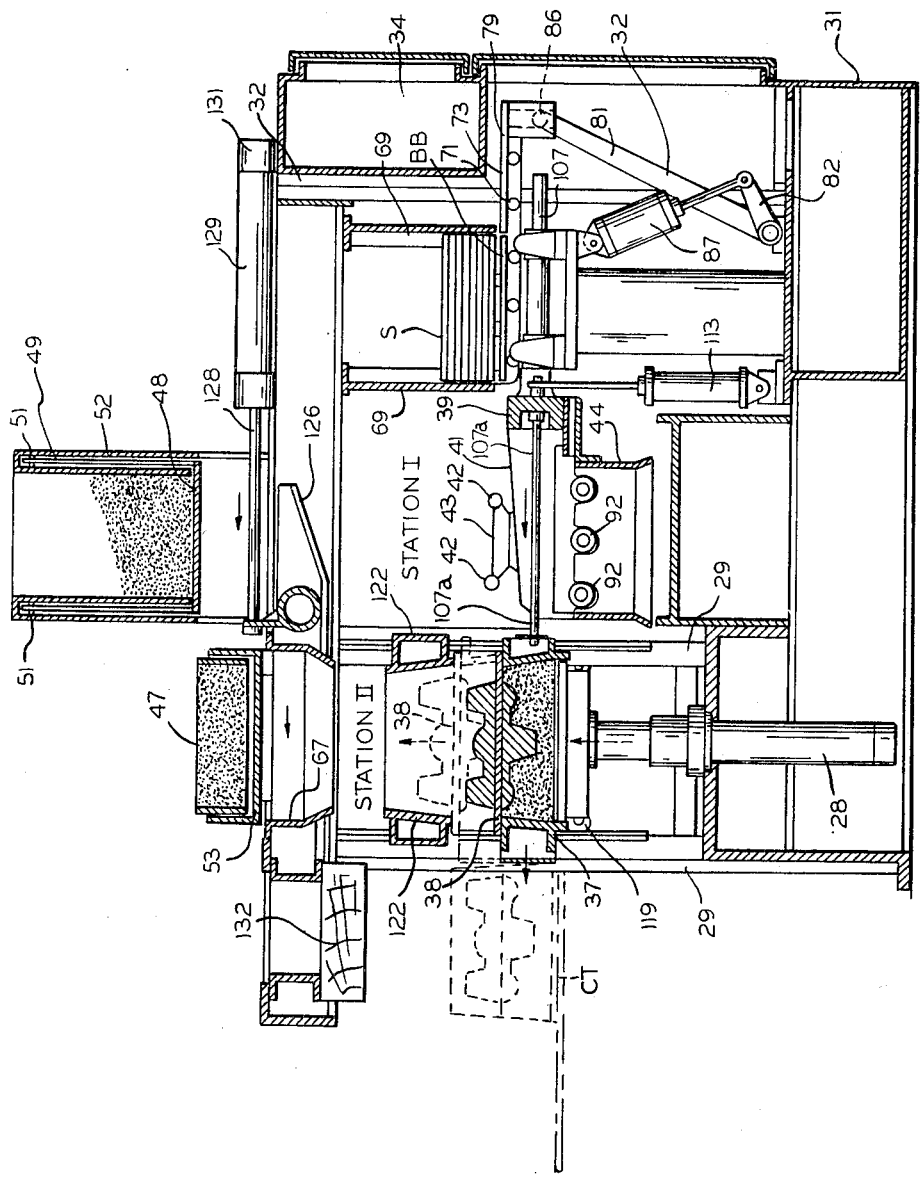

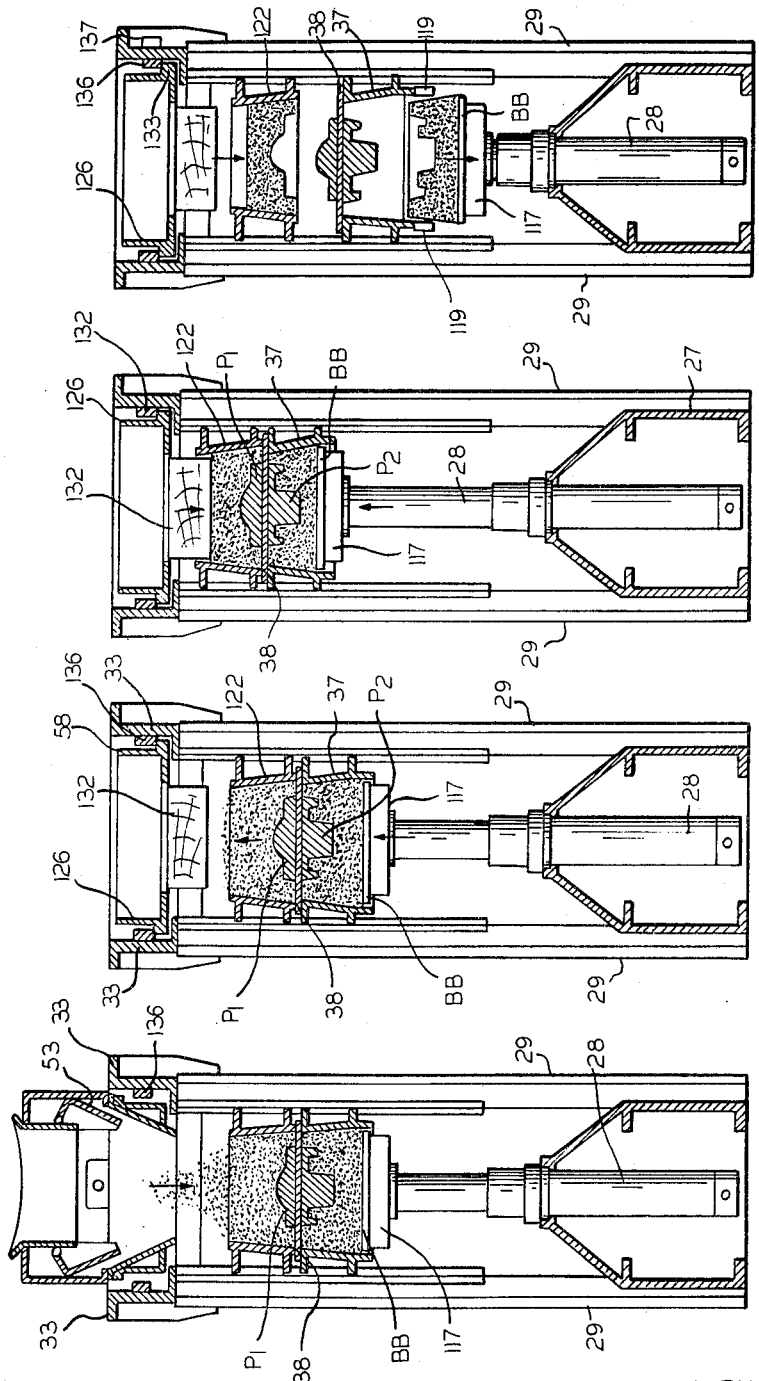

April 14, 1970  W. A. HUNTER  3,506,058
METHOD OF MATCHPLATE MOULDING
Original Filed Nov. 16, 1964  10 Sheets-Sheet 7

INVENTOR
WILLIAM ALLAN HUNTER
BY
ATTORNEY

April 14, 1970 W. A. HUNTER 3,506,058
METHOD OF MATCHPLATE MOULDING
Original Filed Nov. 16, 1964 10 Sheets-Sheet 8
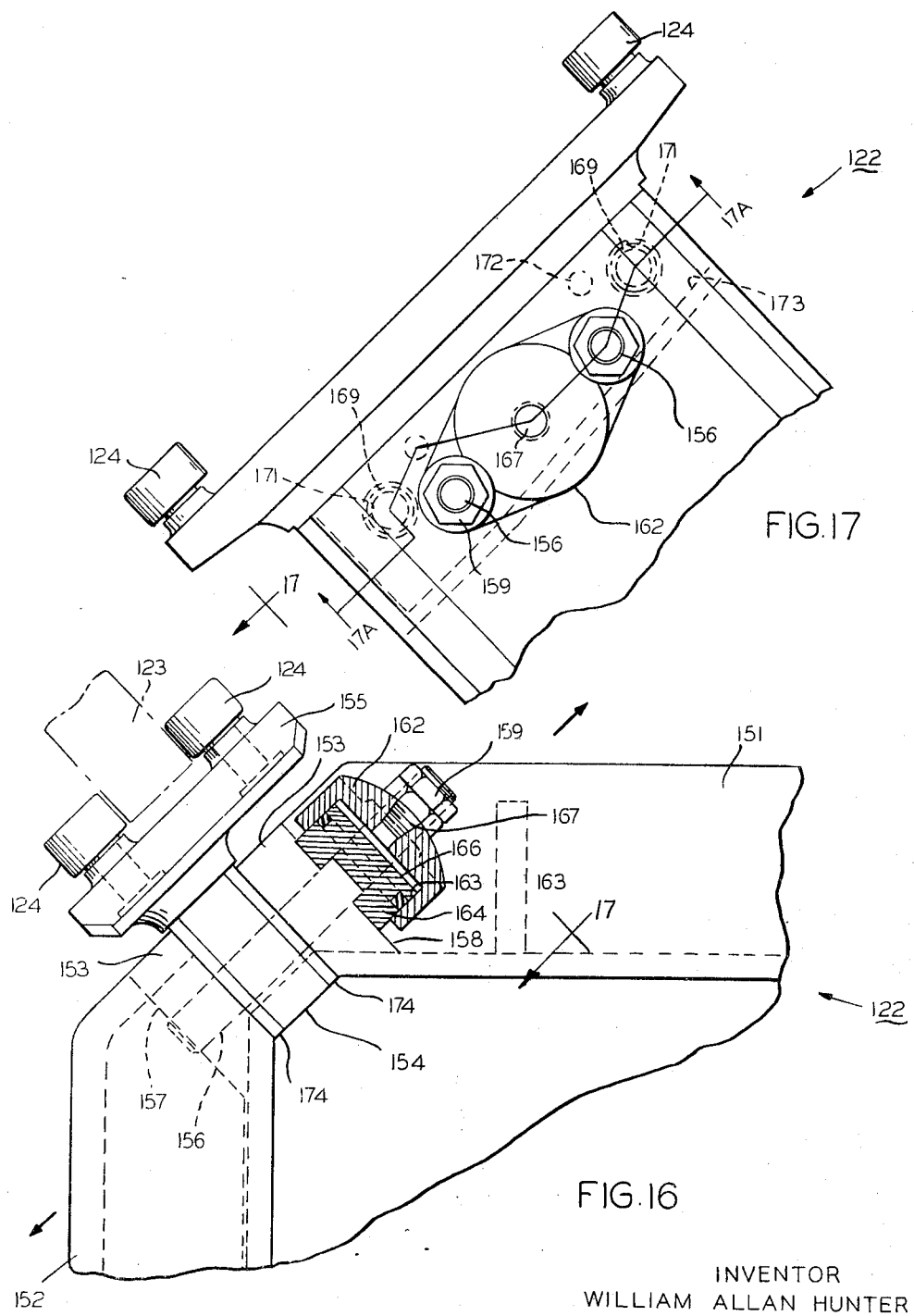
INVENTOR
WILLIAM ALLAN HUNTER
BY
ATTORNEY

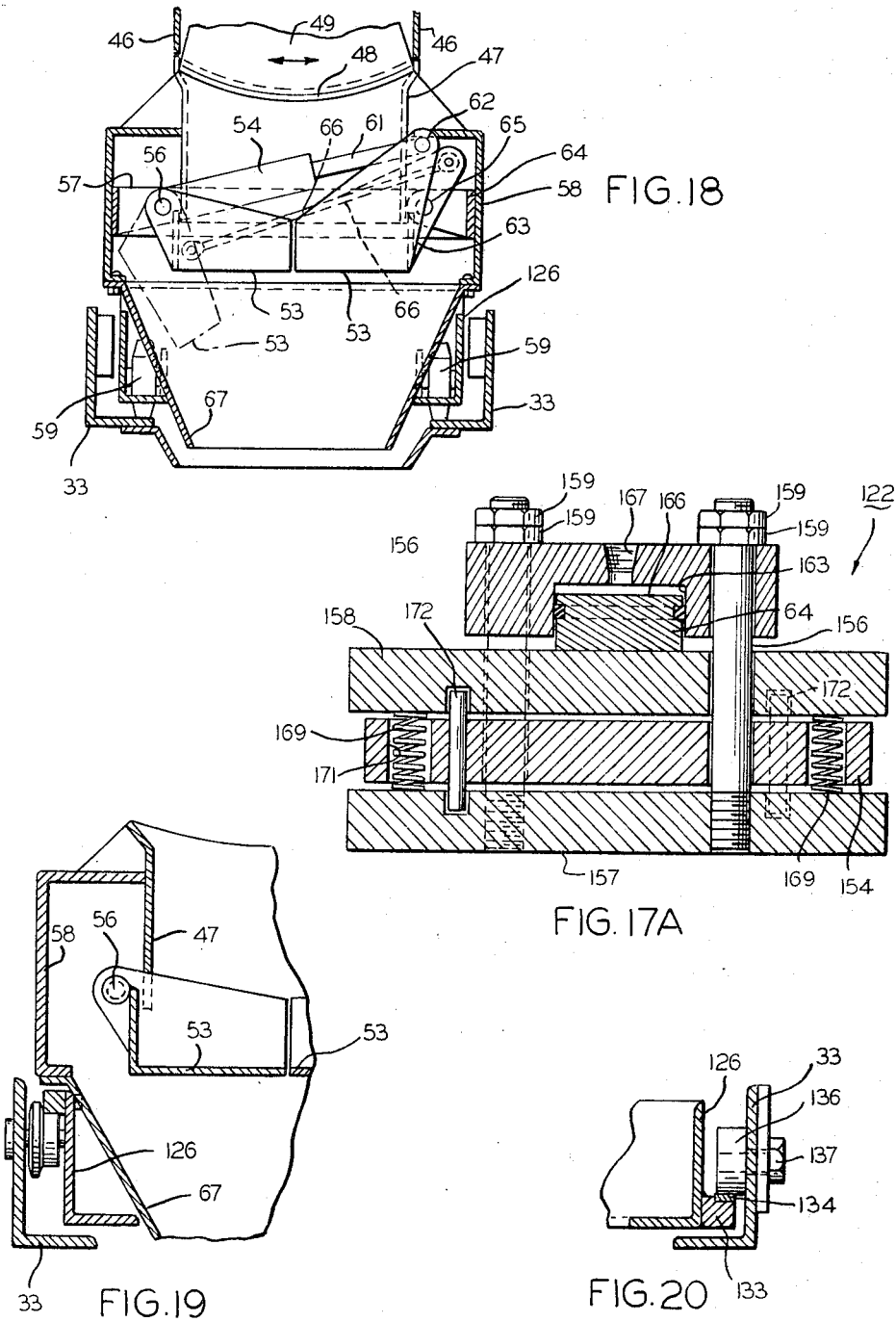

April 14, 1970  W. A. HUNTER  3,506,058
METHOD OF MATCHPLATE MOULDING

Original Filed Nov. 16, 1964  10 Sheets-Sheet 10

INVENTOR
WILLIAM ALLAN HUNTER

BY
*Rud R. Lindberg*
ATTORNEY

United States Patent Office 3,506,058
Patented Apr. 14, 1970

3,506,058
METHOD OF MATCHPLATE MOLDING
William Allan Hunter, Morton Grove, Ill., assignor to Heatherwill Company, Inverness, Palatine, Ill., a partnership
Application Apr. 6, 1967, Ser. No. 633,661, now Patent No. 3,406,738, dated Oct. 22, 1968, which is a continuation of application Ser. No. 411,538, Nov. 16, 1964. Divided and this application June 18, 1968, Ser. No. 744,276
Int. Cl. B22c 15/08, 17/08
U.S. Cl. 164—37         12 Claims

ABSTRACT OF THE DISCLOSURE

Method for matchplate moulding comprising the steps wherein an inverted drag flask is filled against a matchplate at a first station and closed, subsequently erected and transferred to a second station where the filled and erect drag flask is moved against a cope flask with the matchplate therebetween for filling of the cope flask and compacting the moulding sand within both flasks. The method includes the steps of separating the erect and filled drag flask from the filled cope flask, separating the cope mould and releasing the latter from its cope flask to provide a completed mould.

---

This application is a division of Hunter application Ser. No. 633,661, filed Apr. 6, 1967, now Patent No. 3,406,738, issued Oct. 22, 1968, for Automatic Matchplate Moulding Machines, which application is a continuation of application Ser. No. 411,538, filed Nov. 16, 1964, now abandoned, for Automatic Matchplate Moulding Machine.

The present invention has for its particular object the method of making of a foundry mould automatically, which method includes the steps of filling a drag mould while in an inverted position at a first station with a mtach plate secured to such drag flask, turning over the drag flask with moulding material therein at such station to an erect position so that the matchplate is at the top of the drag flask, moving the drag flask and the mould therein to a second station into register with a cope flask thereat, filling the cope flask at such second station while in a position atop the filled drag flask, squeezing the filled drag flask and matchplate from the filled cope flask, removing the drag mould from the drag flask and returning the latter to its first position, moving the drag mould against the cope flask and mould, releasing the sides of the cope flask, and finally removing the finished mould comprised of the cope and drag moulds.

The above described steps of moulding including the steps of moving a squeeze head over the cope and drag flasks and exerting a compacting force on both the cope and drag moulds therein. After such compacting step of the mould at the second station, the drag flask and drag mould are removed from the cope flask and cope mould; the drag flask and matchplate are subsequent separated from the drag mould and returned to the first station for refilling.

With the foregoing considerations in mind it is a principal object of the invention to provide a method for making foundry slip moulds characterized by the use of a matchplate secured at all times to a drag flask, and having a first station where the drag flask is placed in inverted position atop the matchplate and moulding sand is delivered thereto and struck off, and wherein the filled drag flask and matchplate are turned through 180° to an erect position, and transferring the filled drag flask to a second station for cooperation with a cope flask resting upon the matchplate to prepare a cope mould within the cope flask, and subsequently removing both the cope and drag flasks from the moulds therein to provide a finished slip mould.

In the drawings which illustrate structure for carrying out the method according to the present invention, and the method employed to prepare a finished mould;

Figure 5:
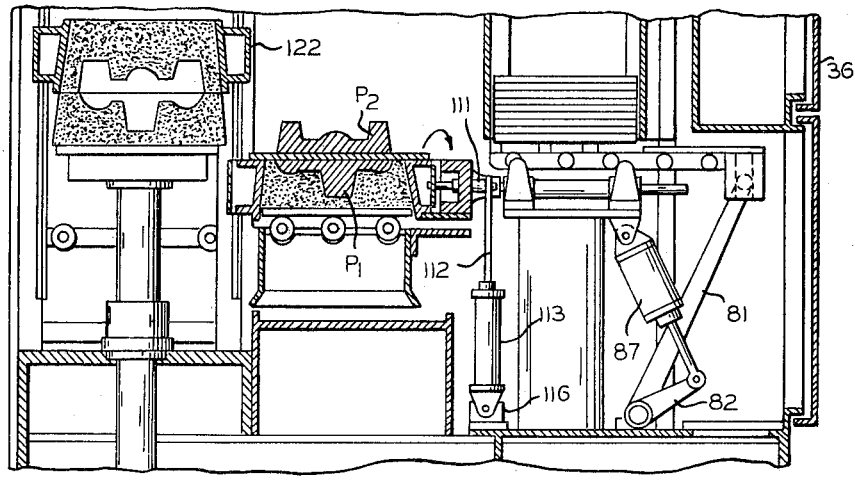
FIG. 5 is a view similar to FIG. 4 showing the bottom board feeding mechanism is retracted position, and the filled drag flask turned through 180° to an upright position.
Figure 6:
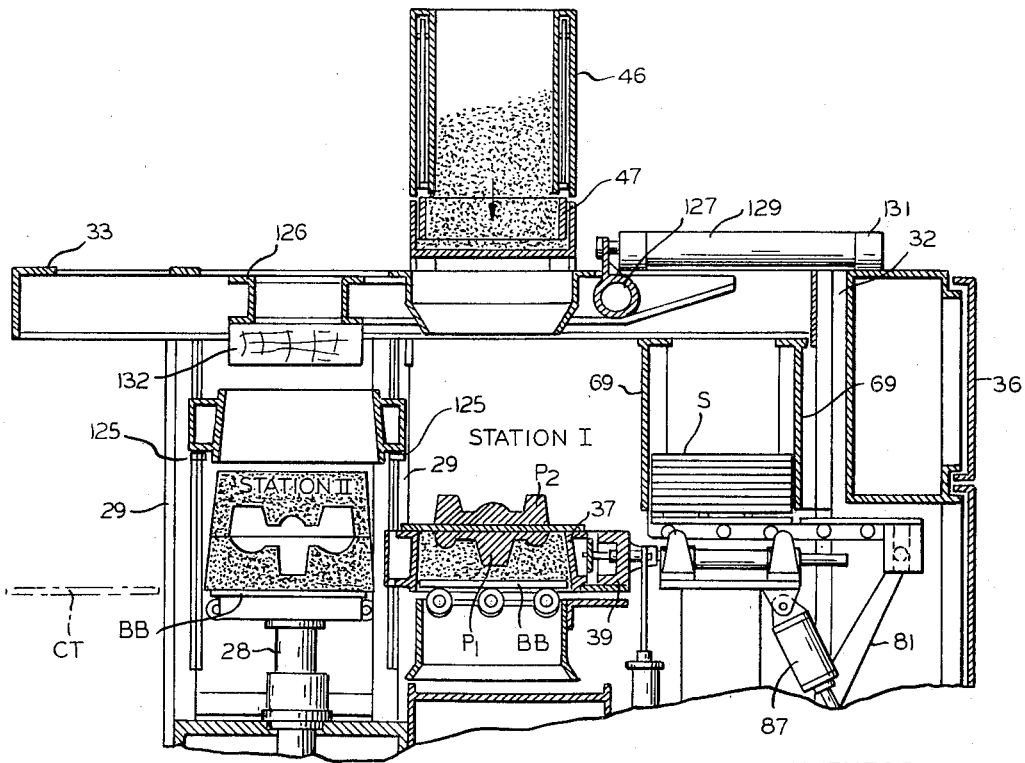

FIG. 6 is a view similar to FIG. 5 showing the filled and erect drag flask ready to be moved into position onto the platen of the pressure ram, and showing a movable fill carriage filled with a metered charge of moulding sand and ready to move into position to fill the cope flask, and showing a completed mould in position on the platen after completion of the moulding method and ready to be pushed therefrom when the drag flask is transferred to the platen;

FIG. 7 is a view showing the filled drag flask and matchplate ready to be moved into position against the cope flask for the filling step thereof, the mechanism for placing the filled drag flask on the platen having been extended, and the fill carriage for filling the cope flask having moved to position atop the cope flask for the step of delivering a metered quantity of moulding and thereto;

FIG. 8 is an end view of the apparatus seen in FIG. 7, and showing the metering hopper of the fill carriage as having completed the step of delivering a metered quantity of moulding sand to the cope flask.

Figure 1:
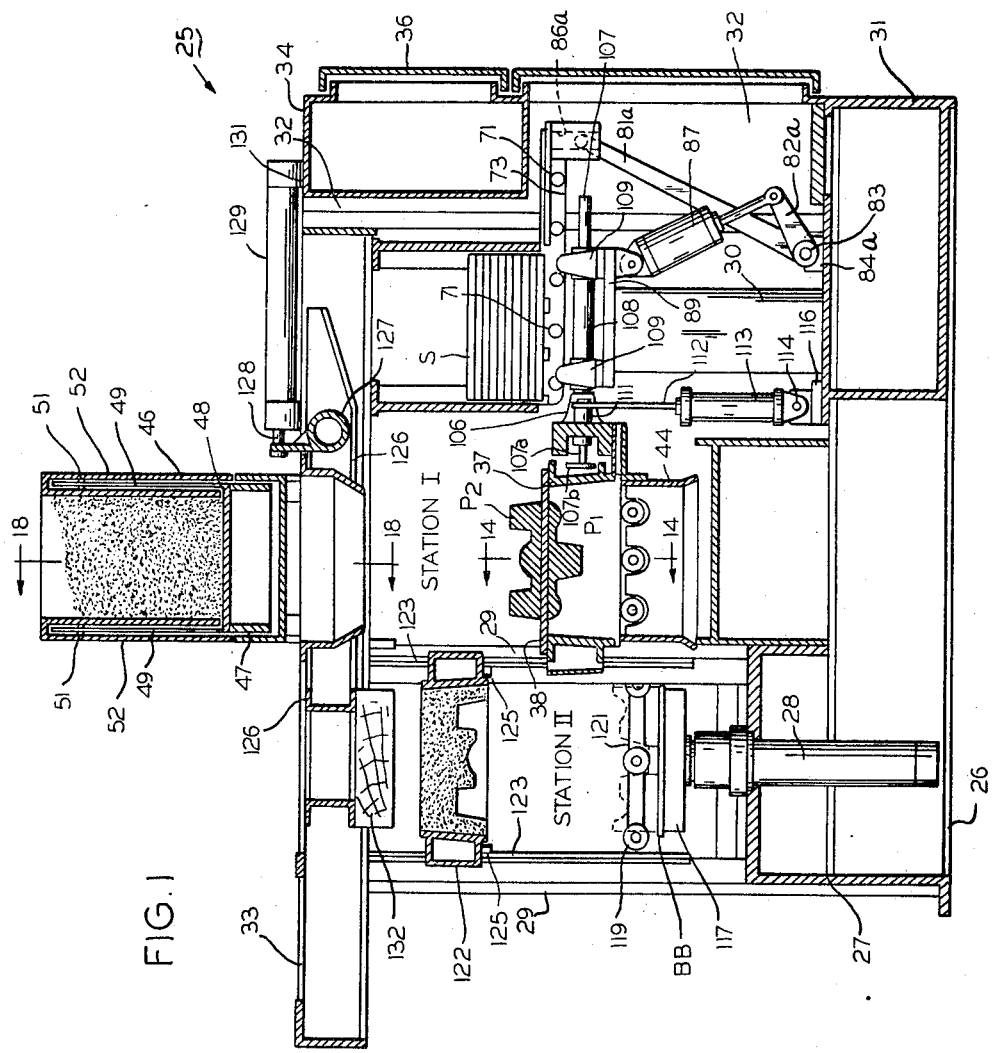
FIG. 1 is a longitudinal elevational view showing somewhat schematically an automatic moulding machine adapted to carry out the method according to the present invention, certain parts of said machine being shown in section, and showing the machine for carrying out the method at the start of a new moulding cycle, and at the completion of a previous moulding cycle.
Figure 2:
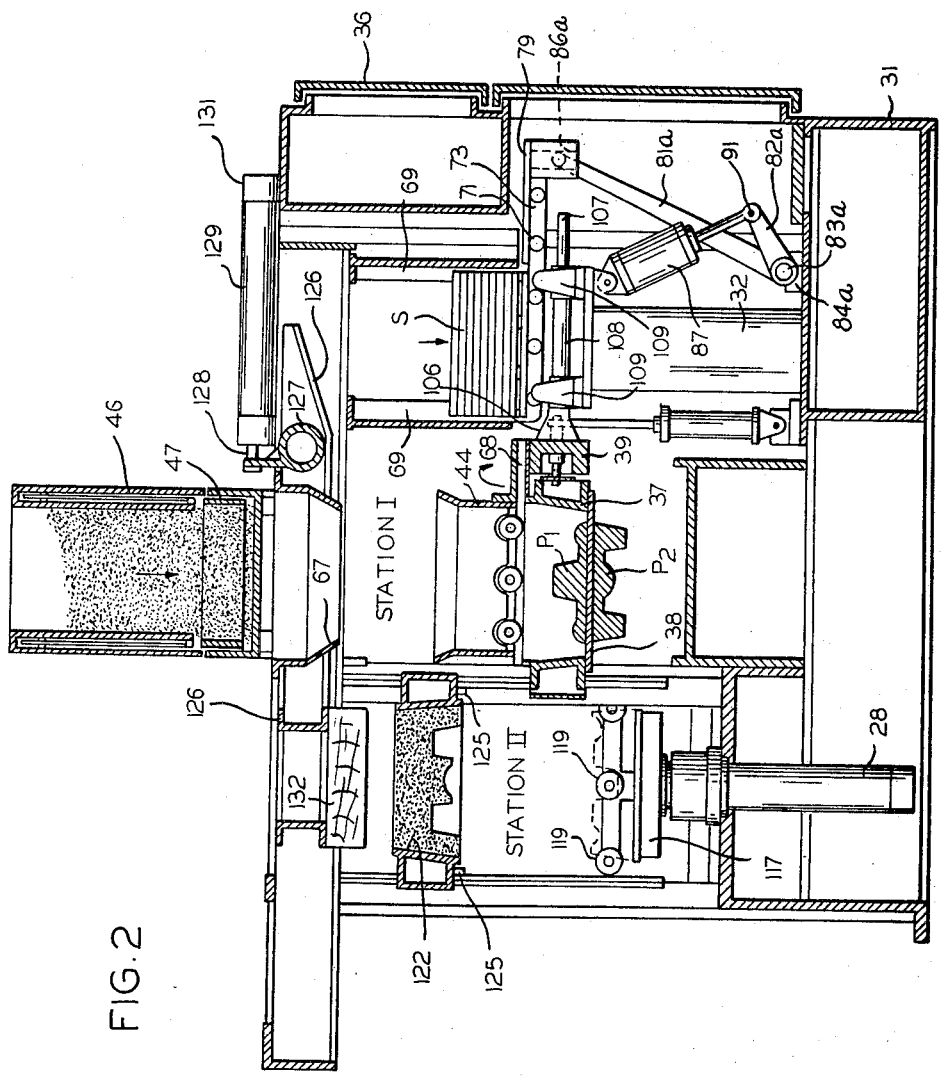
FIG. 2 is a view similar to FIG. 1, showing the start of a moulding cycle, and showing a previously prepared drag mould on a pressure platen ready to move against a cope mould in the cope flask, and subsequently to a position to be removed from the machine, the drag flask being inverted in position for filling and the metering hopper being filled ready for discharge into the inverted drag mould.
Figure 3:
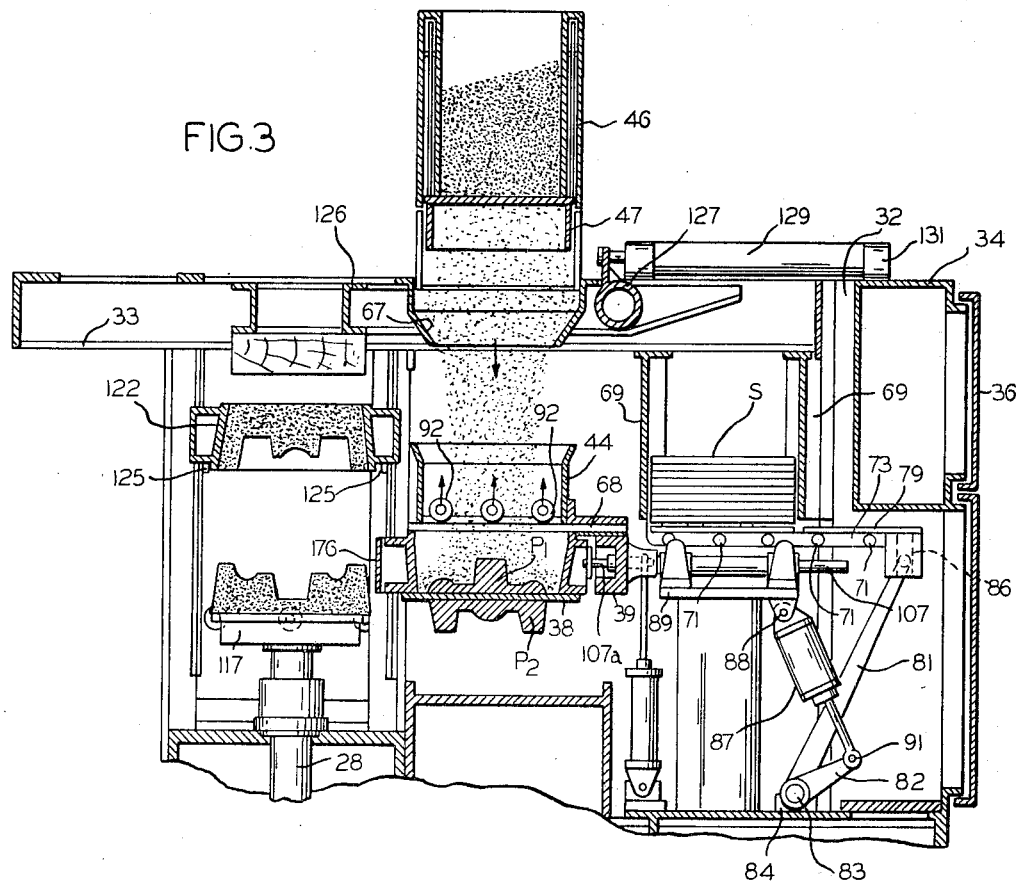
FIG. 3 is a view similar to FIGS. 1 and 2, showing the start of the filling of the inverted drag flask, with the matchplate positioned on the bottom thereof, and the start of the closing of the previously made cope and drag moulds.
Figure 4:
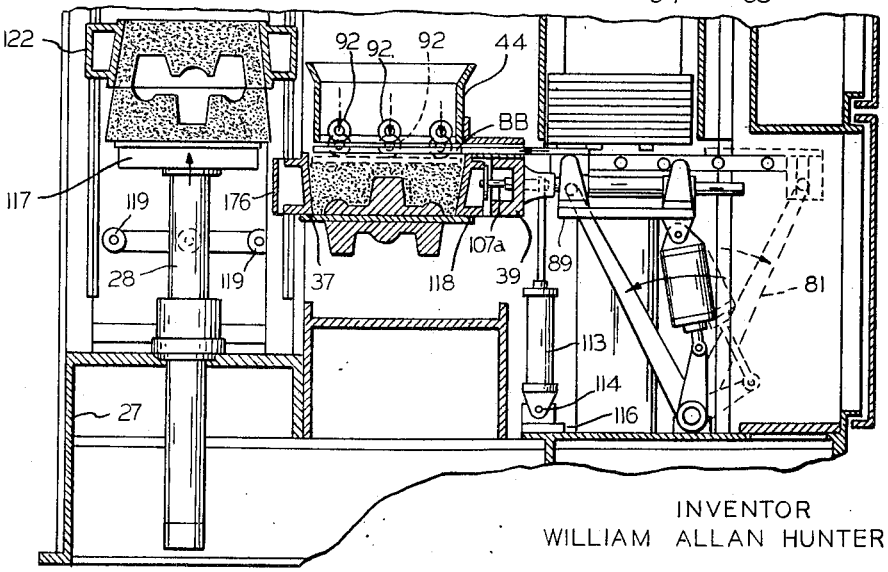
FIG. 4 is a view similar to FIG. 3 showing the completion of the step of filling the drag flask and the movement of a bottom board into position atop the inverted drag flask and the final closing of the previously made cope and drag moulds.
Figures 12, 13:
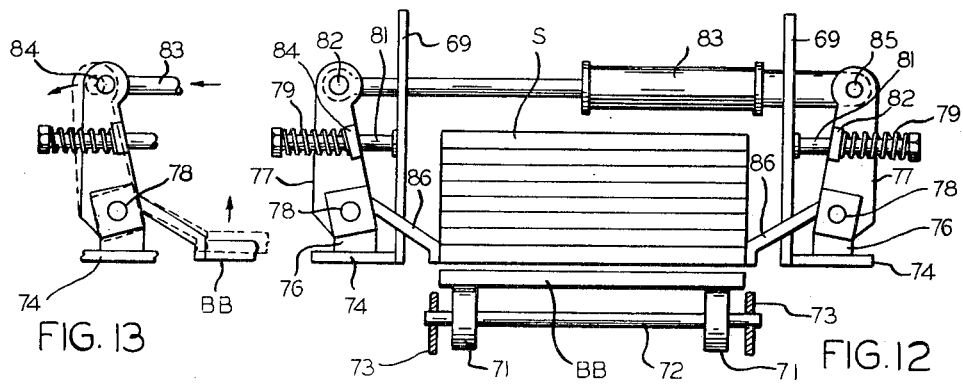
Figure 14:
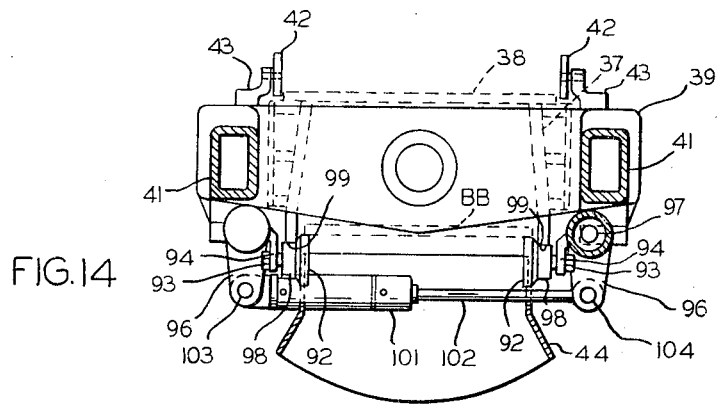

FIG. 9 is a view similar to FIG. 8, but showing the squeeze head of the fill carriage in position atop the filled cope flask to commence the step of compacting;

FIG. 10 is a view similar to FIG. 9, but showing the step of compacting the moulds in both the cope and drag flasks;

FIG. 11 is a view similar to FIG. 10 but showing the steps of retracting the ram from the filled cope flask, the drag flask and matchplate from the drag mould;

FIG. 12 is an enlarged detailed end view of apparatus for feeding a bottom board for closing the filled and inverted drag flask seen in FIGS. 2 to 4 inclusive;

FIG. 13 is a detailed end view thereof;

FIG. 14 is a transverse section taken along the line 14—14 of FIG. 1 showing details of mechanism for supporting the drag flask and the bottom board for the step of movement on to the pressure platen seen in FIG. 1;

3,506,058

3

Figure 15:
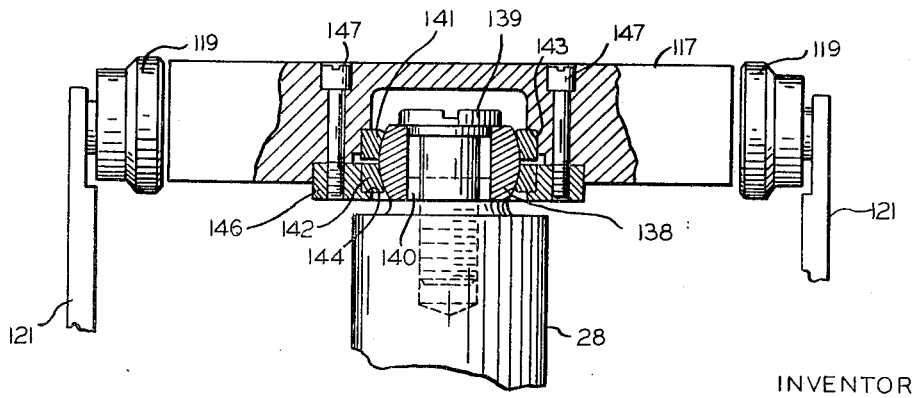
Figure 21:
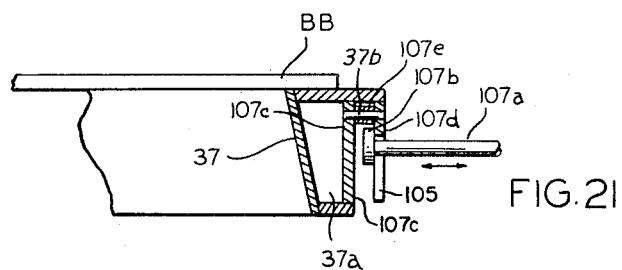
Figure 22:
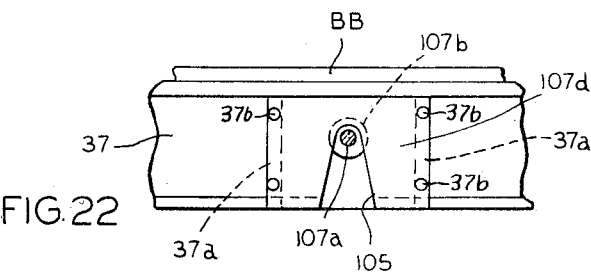

FIG. 15 is a detailed elevational view showing structure for the step of applying pressure to the filled drag and cope flasks;

FIG. 16 is a fragmentary plan view of a corner of the cope flask, showing releasable structure for clamping the cope flask sides and ends firmly together, and for release of the same to free a cope mould therein;

FIG. 17 is a side view looking in the direction of the arrows 17—17 of FIG. 16, showing details of structure for aligning and opening the corners of the cope flask;

FIG. 17A is a section taken along the line 17A—17A of FIG. 17 looking in the direction of the arrows;

FIG. 18 is a detailed cross sectional view taken substantially along the line 18—18 of FIG. 1 looking in the direction of the arrows, showing mechanism for the steps of filling the cope and drag flasks, including the main supply hopper in its relationship to the metering hopper of the fill carriage, and showing the hopper gates of the hopper in closed position;

FIG. 19 is a detailed transverse sectional view through the metering hopper of the fill carriage, showing the gates thereof closed and in a position for the step whereby the fill carriage moves to a position to discharge into the cope flask;

FIG. 20 is a detailed sectional view taken transverse to the frame supporting the fill carriage, and showing how the reaction against the carriage when the cope and drag flasks are in position seen in FIG. 11 are taken by the frame;

FIG. 21 is a detailed view showing the push rod in position connected to the drag flask for the steps whereby the drag flask is moved to the platen and returned to the filling station;

FIG. 22 is an elevation view of FIG. 21; and

Figure 23:
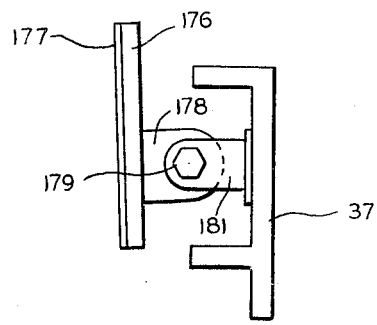

FIG. 23 is a detail of structure mounted on the drag flask for pushing a completed mould from the platen.

Referring now particularly to FIGS. 1 to 7 of the drawings, the method according to the present invention is carried on in a moulding machine referred to generally by reference numeral 25. The moulding machine 25 consists of a base frame 26 supporting a stage 27 for a ram device 28, there being corner frame members 29 extending upward from the stage 27. The base 26 also forms a support for an oil reservoir 31 containing a supply of hydraulic oil for operation of various hydraulic motors for carrying out certain method steps, as will be described in more detail. A pair of vertical members 30 and 32 flank the oil reservoir 31, and extend upward from the base 26. The upper ends of the corner frame members 29 and the vertical members 30 and 32 have Z-shaped upper frame members 33 secured thereto. The vertical frame members 32 also provide a support for a cabinet 34 having a closure 36, the cabinet 34 enclosing various control mechanisms merely incidental to the present invention.

The method according to the present invention and carried out preferably in the moulding machine disclosed herein can be considered broadly as carried out at a first moulding station denoted Station I for the step of filling an inverted drag flask, and a second moulding station denoted Station II for receiving the erect and filled drag flask from Station I, for the step of filling a cope flask, for placing pressure against the filled drag and cope flasks, subsequently separating the filled flask from the filled cope flask, separating the drag flask from the drag mould, and finally lightly pressing the drag mould against the cope mould while the same is released from the cope mould to provide a finished mould at Station II.

Referring now particularly to FIG. 2, Station I has located thereat an inverted drag flask 37 having a matchplate 38 secured thereto in any convenient fashion. Matchplate 38 is provided with pattern halves $P_1$ and $P_2$, and the drag flask 37 is arranged to be held in a yoke or rollover device 39 having a pair of spaced arms 41 to embrace the sides of the drag flask 37, as seen in FIG. 14, which shows the drag flask 37 in upright or erect position, and

4 as seen also in FIG. 2 wherein the drag flask 37 is in its inverted position. The drag flask 37 is adapted to rest in inverted position upon rollers 42 mounted for free turning on brackets 43 secured in any convenient manner to the spaced arms 41 of the rollover device 39. One of the brackets 43 and the rollers 42 mounted thereon are also shown in FIG. 7, wherein drag flask 37 has been delivered from Station I, after having been filled, to Station II.

Referring back again to FIG. 2, wherein the drag flask 37 is in its inverted position ready for the step of filling, the yoke or rollover 39 device supports a chute 44 surmounted thereon, chute 44 lying under a filling hopper 46 for the moulding sand. The moulding sand is adapted to fall by gravity into a metering hopper 47, see also FIG. 18. Fill hopper 46 is provided with a swing gate 48 at the bottom thereof, swing gate 48 being suspended from spaced arms 49 swiveling on pins 51 in paired side walls 52 of the hopper 46.

The swing gate 48 is adapted to be swung to one side or the other as seen in FIG. 18 to discharge into the metering hopper 47 which has a bottom defined by metering hopper gates 53, see FIGS. 18 and 19. It will be understood that suitable power means, not shown, are provided for operating the swing gate 48 so that the fill hopper 46 can discharge to the metering hopper 47.

Gates 53 are operated by a power cylinder 54 pivotally anchored at 56 to a bracket 57 extending inward from a carriage hopper 58, see FIGS. 18 and 19, mounted on wheels 59 adapted to roll on the upper frame members 33, see also FIGS. 8 and 9. Power cylinder 54 has a piston rod 61 pivotally connected at 62 to an operator 63 flanking one of the gates 53 and secured thereto, the said one gate 53 being pivoted at 65 to a bracket 64 extending inward from the other side of the carriage hopper 58.

The other gate 53 is pivoted at 56, and is connected by an operator link 66 pivoted at each end to a gate 53. It will be seen that when piston rod 61 is retracted, the gates 53 will rock to open position, the moulding sand in the metering hopper 47 dropping by way of a chute 67 made part of the carriage hopper 58 and overlying the drag flask as seen in FIG. 2.

As seen now in FIGS. 2 and 3, the step of depositing a charge of moulding sand into inverted flask 37 contemplates the moulding sand being dropped by gravity from the metering hopper 47 into the chute 44 surmounting the drag flask 37 to fill the drag flask 37. Suitable vibrating means, not shown, is provided for vibrating the drag flask 37 to insure good compaction of the sand against position $P_1$.

The step of covering the inverted drag flask 47 after being filled is accomplished by structure which also strikes off the drag flask 37 after it is filled with stand, and for subsequently erecting the drag flask 37 by operation of the rollover device 39. To this end a slot 68 is provided in the rollover device 39 for the passage of a bottom board BB. A hopper 69 is provided for a stack S of said bottom boards, and structure is provided for advancing the bottommost board BB from the stack S thereof to a position atop the inverted drag flask 37.

As seen particularly in FIG. 12, the bottommost board BB is adapted to rest upon spaced rollers 71 supported on idler shafts 72 supported at their ends in spaced frame members 73. Structure is provided for lifting a slight amount all but the bottommost board, so that the same can be advanced with a minimum of effort into position over the filled drag flask 37 at the same time striking off any excess sand therein. To this end, the sides of the hopper 69 have feet 74 extending therefrom which in turn support brackets 76 having rock arms 77 fast to shafts 78, each shaft 78 being journaled in the bracket 76. Each rock arm 77 is normally biased in the directions seen in FIGS. 12 and 13, normally tending to release engagement with the boards in hopper 69. Such bias is accomplished by a spring 79 guided on long cap screws 81 tapped into the sides of the hopper 69 and constrained between an abutment 82 and the head of each cap screw 81. An expansible fluid motor 83 is mounted between the upper ends of the rock arms 77, being pivotally connected therebetween at 84 and 85. Each of the rock arms has a board engaging finger 86 adapted to engage the next upper one to the bottommost board against expansion of fluid motor 83.

Upon extra force from the fluid motor 83 the parts are strained slightly as seen in FIG. 13 in the dotted outline, to provide an additional rocking effect to the board engaging fingers 86 to lift the entire stack S, except for the bottommost board BB.

Structure is provided for advancing the bottommost board into position atop the inverted and filled drag flask 37, and consists of a slide 79 supported on the rollers 71, and moved by rock arms 81a and 82a fast on a stub shaft 83a supported on an abutment 84a. The free end of rock arm 81a is guided within a yoke 86a and at the end of slide 79, and the slide 79 is moved to a position to push bottom board BB atop the inverted flask 37, as seen in FIG. 4, by means of a fluid motor 87 pivoted at 88 to the underside of a table 89 extending from the vertical frame member 30, and pivoted at 91 to the free end of rock arm 82a.

In so moving to the position atop the inverted flask 37, bottom board BB has the function of striking off the excess moulding sand from the flask 37 whereupon bottom board BB is in position to be clamped thereto.

Structure is provided for clamping the bottom board BB which has been advanced by the slide 79 to a position atop the inverted drag flask 37 after the slide 79 has been retracted and has resumed the position seen in FIGS. 2 and 3. To this end, and as seen with particular reference to FIGS. 4 and 14, the bottom board BB is adapted to be held along its side edges by clamping rollers 92, each being mounted on stub shafts 93 supported in brackets 94 extending from rock arms 96. These are pivotally supported on the yoke arms 41 at 97.

The stub shafts 93 also support rollers 98 flanking the bottom board engaging rollers 92, and adapted to engage the rim 99 of the drag flask 37. The rock arms 96 are actuated to a position to clamp the bottom board BB in place by pressure of the rollers 92 thereagainst, and to clamp the rollers 98 against the rim 99 of the drag flask 37. To this end a cylinder 101 having a piston rod 102 is connected between the two rock arms 96. The cylinder 101 is pivotally connected at 103 to the left rock arm seen in FIG. 14, while the piston rod 102 is pivotally connected at 104 to the right hand rock arm 96 seen in said figure.

It should be borne in mind that the showing of the filled drag flask 37 in FIG. 14 is after the yoke 39 has been rotated through 180° and the step of erecting the filled drag flask has been completed. Such rotation of the filled drag flask 37 takes place prior to the removal of same from Station I to a position atop the ram 28 at Station II.

The step of rotating the filled drag flask to the erect position is accomplished by structure including the yoke 39 which has a trunion 106 extending therefrom, it turning upon the outside of a long cylinder 107 held in a long sleeve 108 supported in spaced standards 109 extending upward from the table 89.

The yoke 39 together with the filled drag flask 37, as has been previously described, is adapted to be rotated through 180° from the position seen in FIG. 2 after being first filled as seen in FIG. 3, compacted and covered with the bottom board BB as seen in FIG. 4, and rotated through the said 180° to the rollover position seen in FIG. 5. The yoke 39 accordingly has a crank 111 extending therefrom pivotally connected to a piston rod 112 of a rollover cylinder 113. Such rollover cylinder is hingedly connected at 114 to an abutment 116 extending upward from the top of the oil reservoir 31.

After the rollover step has been accomplished by rollover cylinder 113, and the parts are in the position seen in FIG. 5, the filled drag flask 37 is subjected to the step of pushing the same onto a platen 117, part of the ram assembly 28 at Station II. This is accomplished by a piston rod 107a moving within the cylinder 107 which in turn is supported within the long sleeve 108. The cylinder 107 is of a double acting type, and has a piston, not shown, adapted to receive pressure fluid selectively on both sides thereof.

As seen in FIGS. 21 and 22, the piston rod 107a has a disk 107b of larger diameter at the end thereof adapted to bear against a pusher plate 107c secured to drag flask 37 when the same is moved to the left to Station II, and to bear against a slotted pull plate 107d when the drag flask 37 is pulled to the right from Station II and back to Station I, as will appear.

Plates 107c and 107d are held in spaced relationship by spacers 107e, and the assembly consisting of the plates 107c and 107d and spacers 107e are held to spaced ribs 37a of a drag flask 37 by fastening screws 37b. As seen in FIG. 22 particularly, pull plate 107d has a slot 105 therein so that the filled drag flask 37 can be lifted out of engagement with the piston rod 107a when the drag flask 37 is at Station II and then lowered backed into engagement therewith for return to Station I, as will be shown.

The step of filling a cope flask 122 is accomplished by structure which is mounted for movement along rails 123 made part of the corner frame members 29, the cope flask 122, see FIGS. 16 and 17, having rollers 124 at the corners thereof engaging the rails 123.

When the drag flask 37 is in position atop the platen 117 of the ram 28, the pattern $P_2$ is now uppermost as seen also in FIG. 6, and the filled drag flask is adapted to be moved into a position of register with the cope flask 122 with the pattern $P_2$ extending therewithin. The ram 28 is arranged to move the filled drag flask to such position whereupon the cope flask 122 will receive a supply of moulding sand.

Structure is provided for receiving a quantity of the moulding sand from the fill hopper 46, delivering the same to the metering hopper 47, and moving the metering hopper 47 to the position atop the cope flask 122 to fill the same. The upper frame members 33 accordingly support for longitudinal movement with respect thereto a sand car 126, see FIG. 18, it being mounted for movement on upper frame members 33 on wheels 59. The sand car 126 has a cross member 127 secured to a piston rod 128 of a car moving cylinder 129, the cylinder 129 being anchored at 131 to one of the vertical members 32. The car 126 together with the metering hopper 47 seen in FIGS. 18 and 19 is adapted to be moved to the left as seen in FIG. 7 to a position atop the cope flask 122.

The step of moving the filled and erect drag flask against the cope flask 122 is accomplished by the ram 28 moving upward. When the carriage 126 has moved to a position above the cope flask 122, the hopper gates 53 seen in FIGS. 18 and 19 are opened, and a metered batch of sand moves down the chute 67 and into the cope flask 122, see also FIG. 8, to complete the step of filling cope flask 122.

After the steps of such filling of the cope flask 122, the sand car 126 returns to the position seen in FIG. 1, where a squeeze head 132 mounted at one end thereof is in position atop the now filled cope flask 122, see also FIG. 9. As seen in FIG. 10, the ram 28 together with its platen 117, moves upward against the squeeze head 132 to consolidate the sand within the cope flask 122 and the drag flask 37 firmly against the patterns $P_1$ and $P_2$ secured to the matchplate 38, and thereby complete the step of squeezing and compacting sand within cope flask 122 and drag flask 37.

Referring now to FIG. 20, the thrust incident to the pressure exerted against the squeeze head 132 and the car 126 is taken by a reaction shoe 133 having a wear gib 134 thereon which comes into engagement with an abutment member 136 held by a cap screw 137 extending through the vertical legs of the upper side frames 33.

Referring now to FIG. 15, the platen 117 is mounted to the ram 28 in such a fashion as to have a slight amount of free swiveling movement to accommodate any tendency of the moulding sand to compact irregularly in the cope flask 122 and the drag flask 37. To this end the top of ram 28 has a double frusto-spherical ring 138 held to ram 28 by a cap screw 139 tapped into the top of ram 28. Ring 138 is seated around a boss 140 at the top of ram 28. Ring 138 is encircled by a pair of upper and lower bearing rings 141 and 142, upper bearing ring 141 being seated against a shoulder 143 in platen 117. Lower bearing ring 142 is seated against a shoulder 144 on a clamping ring 146, and the two rings 141 and 142 are clamped in the position seen in FIG. 15 to platen 17 by a plurality of countersunk screws 147 tapped into clamping ring 146.

Upon the completion of the compaction of the moulding sand in the cope and drag flasks as described, the step of withdrawing the filled drag flask from the filled cope flask is accomplished. The filled drag flask 37 is retracted as seen in FIG. 11, the filled cope flask 122 moving downward against the stops 125. The ram 28 continues its downward movement, the drag flask 37 stopping against the rollers 119 seen also in FIGS. 4, 7, 11, and 15.

Upon the continued movement of the ram 28 downward the step of removing the drag mould from drag flask 37 is accomplished, drag flask 37 remaining in position on the rollers 119 below the finished drag mould. At such time, the drag flask 37 is in position to be retrieved by the piston rod 107a of the double acting cylinder 107 seen in FIG. 1, and to be returned to its position in the yoke 39.

At this time, the drag flask 37 is returned to Station I, where it is again turned through 180° to receive another charge of moulding sand to initiate and complete a series of steps as described.

The step of placing the released mould atop the completed drag mould includes the ram 28 for moving the drag mould now perched on the bottom board BB against the now filled cope flask 122 to lightly engage the mould within the cope flask 122, so that the cope mould therewithin will rest upon the drag mould already prepared. Structure is also provided for releasing the mould within the cope flask 122 by moving the sides and ends thereof laterally of themselves.

In order to complete the step of releasing the cope mould, and as seen particularly in FIGS. 16, 17 and 17A, the cope flask 122 is provided with opposed sides 151 and opposed ends 152, these having mitred corners 153. The mitred corners 153 each abut a corner plate 154 coextensive with a bracket 155 supporting the rollers 124 guided on the vertical rails 123. The sides 151 and the ends 152 of rope flask 122 are held against the corner plates 154 by means of a pair of studs 156 threaded into an abutment 157 at the corner of end member 152 and extending without threaded engagement through corner plate 154 and through an abutment 158 at the mitred corner of side member 151. Pins 156 have locking nuts 159 bearing against a movable cylinder head 162 having a counter bore 163 adapted to receive a piston 164 bearing against abutment 158. Piston 164 has clearance with respect to the cylinder head 162, so that pressure fluid may be introduced to a chamber 166 by means of a drilled passage 167 in cylinder head 162. Passage 167 is tapped to receive a pressure fitting, not shown.

Pressure applied to the chamber 166 holds the sides 151 and the ends 152 to the corner plates 154, but upon release of such pressure the sides 151 and the ends 152 move somewhat laterally as indicated by the arrows seen in FIG. 16. Such lateral movement is achieved by springs 169 held in spring pockets 171 in the corner plate 154 and acting against the abutments 157 and 158.

Dowel pins 172 tightly held in the corner plate 154 project with a sliding fit in the abutments 157 and 158 maintain the assembly thus far described in alignment.

In order to provide for accurate closing of the sides and ends of the cope flask 122 against the corner plates 154, the latter are provided with opposed grooves 173 each to receive a closing gasket 174. It may be noted that the structure for causing release of the mould within the cope flask is disposed at opposite diagonal corners of the flask, while the other diagonal corners have the sides and ends joined thereat in a conventional fashion. In such case, the fixed corners are joined rigidly to the corner plate 154 by conventional fastening means extending through the contiguous side and end.

When the drag mould is moved against the cope mould within the cope flask 122 and the pressure is released in the chamber 166 while the drag mould is lightly pressed against the cope mould, the latter rests upon the drag mould and is removed as the ram 28 moves downward. The finished mould now rests upon the bottom board BB upon platen 117.

This marks the end of the method of matchplate moulding as has been described. The resumption of a moulding method, the step of filling of a drag flask and the transfer thereof from Station I to Station II is concomitant with the pushing of the finished mould seen in FIG. 7 on to a conveyor table CT of any convenient kind.

In order to push the finished mould from the platen 117 on to the conveyor table CT, the drag flask 37, see FIG. 23, is provided with a pusher member 176 having a resilient facing 177 generally canted, as shown, to match the draft angle of the finished mould. Pusher member 176 has an ear 178 fastened by a yieldable friction pivot pin 179 in turn secured to a bracket 181 extending from the outside of drag flask 37.

It should be understood that the description thus far predicated upon an assumption that the method according to the present invention has proceeded from a start condition where the machine has been completely cleared.

A brief summary of the steps performed by the apparatus described in the carrying out of the method without the assumption that the machine is starting from a completely cleared position will serve to clarify the operations in the carrying out of the method.

For example, FIGS. 3 and 4 show the movement of the completed drag mould toward the filled cope flask to lightly press against the same, and the thereafter withdrawal of the pressure platen 117 with the finished mould to discharge the same. At this time, and as seen in FIG. 3, the drag flask 37 has been rotated to its inverted position for the step of filling, it being shown in such inverted position also in FIG. 2. As seen in said figure, the sand hopper 46 and chute 44 are in alignment to drop a sand charge into drag flask 37 to fill the same, see also FIG. 3. In this latter figure the drag mould is moving with platen 117 toward the filled cope flask 122 to lightly press against the mould therein. Drag mould 37 is resting on its bottom board BB. In FIG. 4 the drag mould is lightly pressing against the cope mould while the sides of cope flask 122 are being opened, and at this time ram 28 is ready to be withdrawn, at which time turnover of the inverted and filled drag flask 37 at Station I takes place. Prior to turnover of the filled drag flask 37, it is covered by the bottom board BB, which is clamped into place before the turnover operation. As seen in FIG. 5, the ram 28 is retracting, and in FIG. 6 the filled and upright drag flask 37 is ready to be moved on to the platen 117.

In this latter view, the car 126 has moved back under the fill hopper 46 to receive in its meter hopper 47 a metered supply of moulding sand for the cope flask 122. As seen in FIG. 7, the filled drag flask 37 with its match plate is moving toward cope flask 122 to close the bottom thereof, the moulding sand falling into cope flask 122 when gates 53 of meter hopper 47 are opened. FIG. 8 shows the entire flask closed, and FIGS. 9 and 10 show the squeeze head 132 completing the compacting.

FIG. 11 shows the separation after compaction, the sequence being repeated as before described.

It will be understood that proper control mechanism is provided for the aforesaid method sequence. Various motor devices have been described in detail for the operation of various mechanisms forming part of the invention, and it will be appreciated that such fluid motors may be either air or oil operated. It will be appreciated also that such motors may be under control of various forms of switches, all in circuits including the usual control elements. The addition of control elements to provide the operations and sequencing described is merely incidental to the invention herein.

From the foregoing description it is believed evident that there has been provided a new and useful method for accomplishing moulding in a continuous operation, and with but a single flask comprised of a drag flask and a cope flask with a single common matchplate. The moulding method is accomplished by the use of the drag flask at a first station where it is filled and turned, and a cope flask located at a second station and cooperating with the drag flask after it has been filled and moved to the second station. The moulding method is also accomplished by a movable metering hopper movable between two positions and having a compacting head thereon which is in compacting position for compacting of the cope and drag flasks after the cope flask has been filled.

I claim:

1. In a method of matchplate moulding wherein a drag flask having a matchplate fixedly secured thereto is first inverted, filled and erected, the steps of moving the erect and filled drag flask against a cope flask, filling the cope flask, compacting the moulding material in both of said flasks with the match plate therebetween, withdrawing the drag flask and mould therein from said cope flask, withdrawing the drag flask from the drag mould, removing the drag flask from the space between said cope flask and drag mould, moving the drag mould toward the filled cope flask to contact the cope mould therein, releasing the cope mould from the cope flask, and removing the finished mould from said cope flask.

2. In a method of matchplate according to claim 1 wherein said drag flask removing step includes the step of moving the drag flask laterally of said cope flask to a position for refilling.

3. In a method of matchplate moulding according to claim 2 which includes the step of inverting said drag flask after lateral movement thereof to a position for refilling.

4. In a method of matchplate moulding according to claim 1 which includes the step of moving single filling means for said flasks between drag flask filling position and cope flask filling position.

5. In a method according to claim 4 which includes the step where the filling means performs the step of compacting the cope and drag moulds.

6. In a method according to claim 1 which includes the step wherein the filled and erect drag flask is moved into a position of alignment with said cope flask to remove the finished mould.

7. An improved method of matchplate moulding which comprises filling an inverted drag flask having a matchplate fixedly secured thereto, covering the inverted and filled drag flask, rotating the inverted, filled and covered drag flask to an erect position, moving the erect drag flask with cover to a position of alignment with a cope flask, moving the erect drag flask against the cope flask with the matchplate therebetween, filling the cope flask, applying pressure against the cope flask and drag flask, withdrawing the drag flask and matchplate as a unit from the cope flask with a cope mould held in said cope flask, withdrawing the drag mould from said drag flask, removing the drag flask from the space between said cope flask and drag mould, moving the drag mould against the cope mould, releasing the cope mould within said cope flask, and separating the drag and cope moulds as a closed mould from said cope flask.

8. The method according to claim 7 wherein the step of removing said drag flask includes the step of moving the empty drag flask away from said drag mould and out of the direct path of movement of said drag mould toward said cope mould.

9. The method of claim 7 which includes the step of moving a filled and erect drag flask against the completed drag and cope moulds.

10. In a method of matchplate moulding wherein a cope flask and a drag flask are filled with compacted moulding material against a matchplate fixedly secured to said drag flask, the step of moving said drag flask and said matchplate along a path of movement away from said cope flask, the step of separating said drag flask from the drag mould therein, the step of moving said drag flask and matchplate in a direction laterally of said path of movement, and the step of moving said drag mould for movement along said path of movement toward the cope mould in said cope flask.

11. In a method of moulding according to claim 10 which includes the step of releasing the sides of said cope flask to release the cope mould therein when said drag mould is moved along said path of movement to engagement with said cope mould.

12. In a method according to claim 11 which includes the step of moving the filled drag flask and matchplate in a lateral direction toward a complete mould consisting of said cope and drag moulds to remove the complete mould.

References Cited

UNITED STATES PATENTS

| 2,867,870 | 1/1959 | Hines | 164—37 X |
| 3,200,449 | 8/1965 | Hatch | 164—194 X |

FOREIGN PATENTS

| 46,380 | 4/1929 | Norway. |

ROBERT D. BALDWIN, Primary Examiner

U.S. Cl. X.R.

164—44